United States Patent [19]

Goebel

[11] 4,336,717
[45] Jun. 29, 1982

[54] DEVICE TO CLAMP A WHEEL ON THE SHAFT OF A BALANCING MACHINE

[75] Inventor: Eickhart Goebel, Pfungstadt, Fed. Rep. of Germany

[73] Assignee: Gebr. Hofmann GmbH & Co. KG, Maschinenfabrik, Darmstadt, Fed. Rep. of Germany

[21] Appl. No.: 181,981

[22] Filed: Aug. 28, 1980

[30] Foreign Application Priority Data

Aug. 31, 1979 [DE] Fed. Rep. of Germany ....... 2935216

[51] Int. Cl.³ ............................................. G01M 1/06
[52] U.S. Cl. .................................................... 73/487
[58] Field of Search ................. 73/460, 487; 411/433; 157/14, 1.24; 301/9 DH, 9 CN

[56] References Cited

U.S. PATENT DOCUMENTS 1,649,349 11/1927 Hynan ............................. 301/9 DH
4,188,828 2/1980 Cuccolini .............................. 73/460

FOREIGN PATENT DOCUMENTS 7103703 2/1971 Fed. Rep. of Germany .
40106 9/1965 German Democratic Rep. .

*Primary Examiner*—James J. Gill
*Attorney, Agent, or Firm*—Fleit & Jacobson

[57] ABSTRACT

A clamping device for clamping a vehicle wheel on a threaded clamping shaft of a test machine, such as, a balancing machine. The clamping device includes a basic body positionable on the clamping shaft and a pair of swivelling levers pivotally mounted on the basic body. Each of the levers has an extremity forming a threaded section movable into and out of engagement with the threaded clamping shaft and an actuating lever for controlling engagement of the threaded segment with the clamping shaft. The levers have portions thereof cooperating with each other in such manner that movement of one of the levers results in conjoint movement of the other of the levers. The basic body has handles formed integrally therewith or attached thereto that protrude away from the axis of the threaded shaft. The handles have recessed portions for receiving the actuating ends of the swivelling levers. The swivelling levers have stop portions engageable with portions of the basic body to limit engagement of the threaded segments with the clamping shaft. The distance between the pivotal connections of the swivelling levels to the basic body is less than the distance between the threaded segments, when in a clamping position. Springs are provided for biasing the threaded segments into engagement with the clamping shaft.

10 Claims, 2 Drawing Figures

DEVICE TO CLAMP A WHEEL ON THE SHAFT OF A BALANCING MACHINE

BACKGROUND OF THE INVENTION

The invention relates to a clamping device especially designed for clamping an automobile wheel on the clamping shaft of a balancing machine having two flexibly supported and radially movable threaded segments which are provided on one point each of the clamping device.

DESCRIPTION OF THE PRIOR ART

Clamping devices to clamp automobile wheels on the clamping shaft of a balancing machine are known in various forms. The German utility model No. DE-GM 7 103 703 relates, for example, to a universal centering device clamping automobile wheels by their center bores. A pre-centering device connected with the centering body is provided with an internal thread fitting onto the external thread of the clamping shaft of the balancing machine. In order to clamp the wheel or rotating body to be balanced, the pre-centering device has to be screwed onto the clamping shaft. Depending on the length of this clamping shaft, screwing and unscrewing will take a lot of time thus unnecessarily extending the balancing procedure.

GDR Pat. No. DD-PS 40 106 relates to a quick-clamping nut in which at nut does not have a thread of its own, but has threaded segments pressed inwards by displacement of an external clamping ring so as to represent the thread of the nut. The threaded segments are pressed outwards by means of pressure springs, and only moved in place by means of a clamping ring. This, however, does not ensure that the thread will engage with the spindle under normal conditions, i.e., when it is not actuated.

The publicly distributed German patent application No. DE-OS 2 807 343 relates to an automatic centering device to clamp an automobile wheel on the shaft of a balancing machine, said centering device comprising a sleeve movable on the shaft, and a collar displaceable on the threaded portion of the shaft, said collar being fixed to swivelling levers having a partial thread each which form then a detachable connection between the collar and the shaft.

This previously known device has the disadvantage that the individual swivelling levers have to be actuated separately thus not ensuring safe manipulation. Furthermore, the levers are provided outside the actual clamping nut, thus being easily exposed to damage. A further disadvantage consists in the threaded segments being strongly pressed into the external thread of the clamping shaft when the wheel is clamped so that nut and spindle might be jammed.

SUMMARY OF THE INVENTION

Therefore, an object of the present invention is to avoid the disadvantages of the well-known clamping devices, and to provide a device ensuring safe and clear manipulation, as well as relatively inexpensive construction.

Characteristics of the above-mentioned clamping device are set forth in the attached main claim. The subclaims comprise expedient improvements of the invention.

The arrangement in the present invention of swivelling levers inside a quick-clamping nut ensures that the levers are not likely to be damaged under the hard conditions of garage application, and—due to connection of the two swivelling levers—that the two threaded segments engage with or are disengaged from the external thread of the clamping shaft simultaneously.

Thanks to the stop of the swivelling lever, the threaded segments cannot sufficiently engage with the external thread so as to jam. Due to the slight distance between the pivots of the swivelling levers, the lever arm between the threaded segments and the pivot is increased, thus obtaining an improved "rattling" effect when the quick-clamping nut is pushed on the clamping shaft without the threaded segments being removed. Since pressure is directed radially towards the center due to the specific arrangement of the springs, it can be ensured that the threaded segments engage safely with the external thread of the clamping shaft. Furthermore, the basic body of the clamping device can be smaller than usual since the pivots of the swivelling levers are situated within the inside diameter of the threaded segments.

BRIEF DESCRIPTION OF THE DRAWINGS

An embodiment in accordance with the invention is illustrated in the accompanying drawings, in which.

DESCRIPTION OF THE PREFERRED EMBODIMENT

Figure 1:
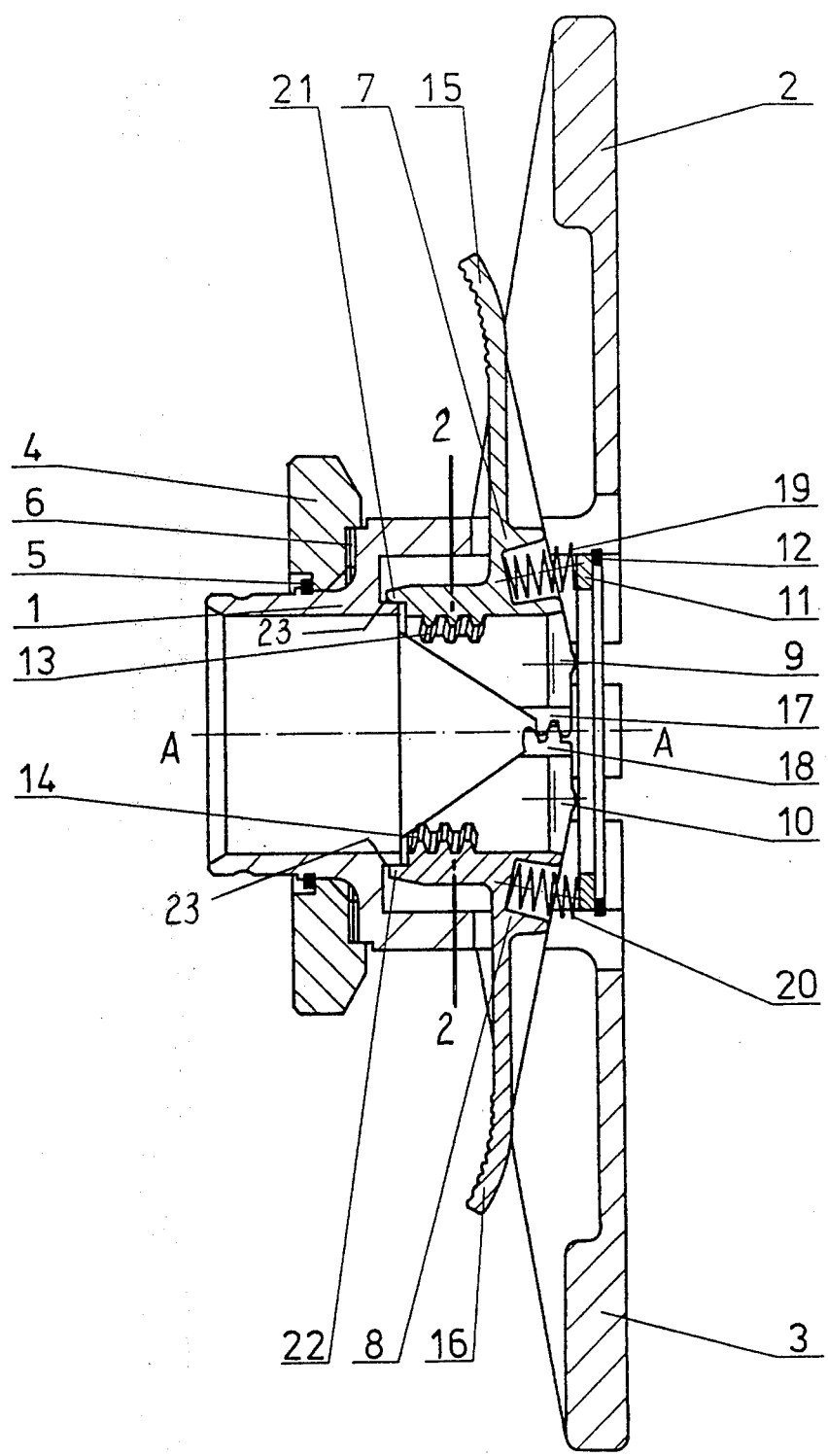
FIG. 1 is a sectional view of the device.
Figure 2:
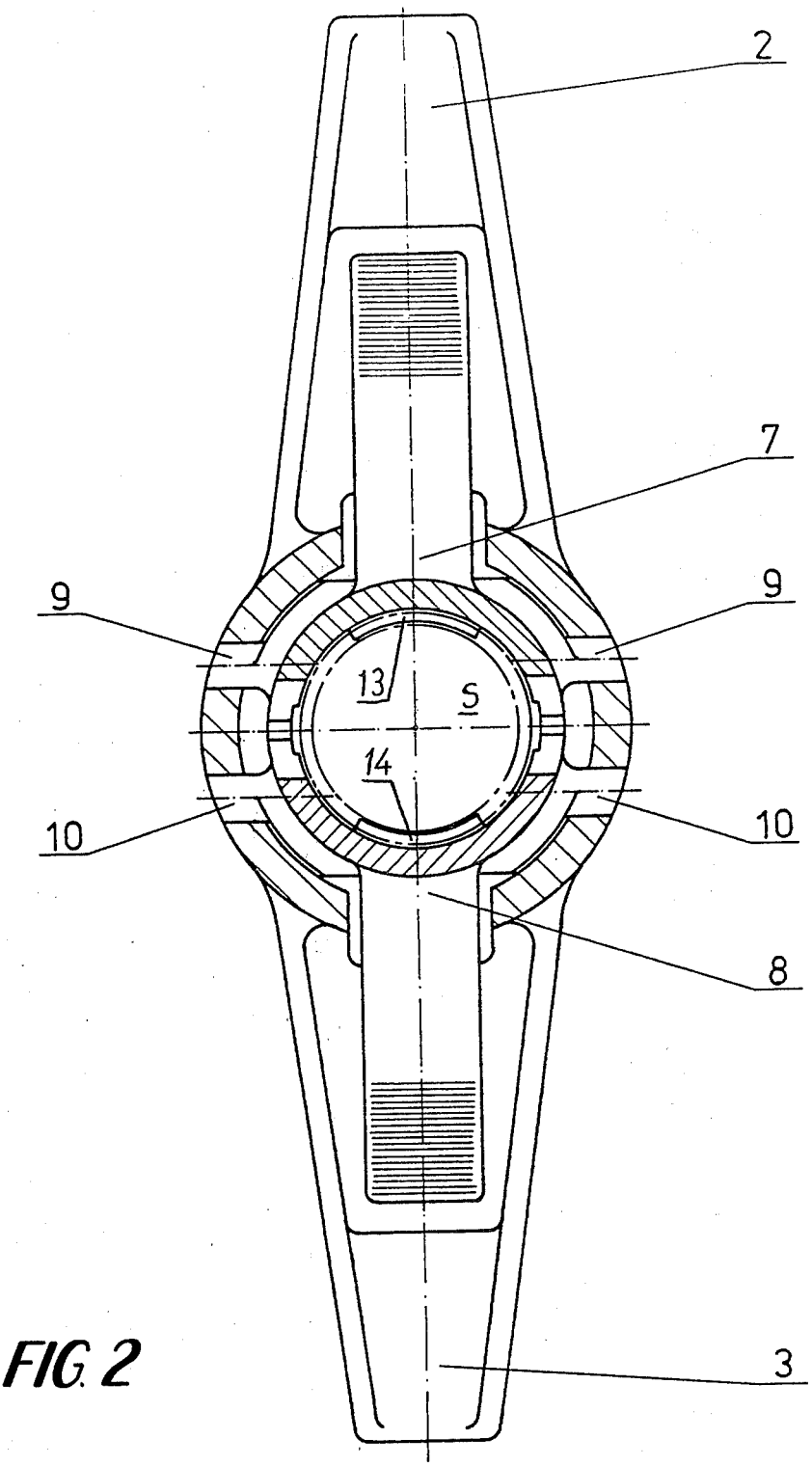
FIG. 2 is a sectional view, modified to include a threaded shaft, along line 2—2 of FIG. 1.

The clamping device illustrated in FIGS. 1 and 2 comprises a basic body 1 which might be provided with the two handles 2 and 3, as usual with wing nuts. On the side facing the test machine, there is an intermediate ring 4 which is rotatably supported on the basic body, and which is secured by means of a spring ring 5. Shims 6 are provided between the basic body 1 and the intermediate ring 4 in order to reduce friction. The intermediate ring 4, when the clamping device is in proper position on a threaded clamping shaft of a test machine, a portion of which designated S is illustrated, exerts a clamping force on a vehicle wheel or other rotatable body previously positioned on the shaft.

On its opposite side, the basic body 1 is provided with two openings to incorporate two swivelling levers 7 and 8 which are pivoted on the points 9 and 10, respectively. A supporting washer 11 and a circlip 12 are mounted to secure the swivelling levers 7 and 8 in the basic body.

The threaded segments 13 and 14 and the actual actuating levers 15 and 16 are provided on one side of the swivelling levers 7 and 8, with the actuating levers being movable into and out of recesses formed in the handles 2 and 3. The respective other sides of the swivelling levers 7 and 8 are generally arcuate-shaped so that the levers mesh with one another, preferably by means of teeth 17 and 18.

As a result, the respective other of the swivelling levers 7 or 8 is automatically moved upon actuation of only one of the levers 15 or 16.

To maintain the swivelling levers 7 and 8 with their threaded segments 13 and 14 in their normal position, which means that the threaded segments 13 and 14 engage with the external thread of the clamping shaft, there are provided preferably two pressure springs 19 and 20 to press the threaded segments 13 and 14 radially inwards.

Stops 21 and 22 are formed on the levers 7 and 8. These stops engage engagement surface 23 on the basic body 1 to limit engagement of the threaded segments 13 and 14 with the external thread of the clamping shafts. This is to ensure that the threads do not jam upon clamping.

Due to the slight center distance of the two pivots 9 and 10, an improved "rattling" effect is obtained when the clamping device is pushed on the shaft.

In use, a wheel is positioned on the clamping shaft S. Then, the levers 15 and 16 are moved into the recesses in the handles 2 and 3 to move the threaded segments away from the axis A of the basic body. Since the teeth 17 and 18 are in mesh with each other, only one of the levers 15 and 16 must be gripped to cause such movement. The clamping device is then positioned on the clamping shaft and translated with respect to the shaft to position intermediate ring 4 close to or in contact with the wheel. The levers 15 and 16 are then released so that springs 19 and 20 urge segments 13 and 14 into engagement with the shaft S. If necessary, the clamping device is then rotated to securely clamp the wheel to the test machine. After the wheel has been tested and balanced, one or both of the actuating levers 15 and 16 is moved towards the recesses in the handles 2 and 3 to disengage the threaded segments 13 and 14 from the clamping shaft. The clamping device is then removed from the clamping shaft to permit removal of the balanced wheel.

What is claimed is:

1. Clamping device for clamping a vehicle wheel on a threaded clamping shaft of a test machine comprising:
   means for defining a basic body (1) positionable on and translatable and rotatable with respect to a threaded clamping shaft (S) of a balancing machine; and
   a pair of swivelling levers (7,8) pivotally mounted on said basic body, each of said levers having an extremity thereof forming a threaded segment (13,14) movable into an out of engagement with the threaded clamping shaft, an extremity forming an actuating lever (15,16) for controlling engagement of said threaded segment with the threaded clamping shaft, and a portion (17,18) thereof cooperating with a corresponding portion of the other lever in such manner that movement of one of said levers results in conjoint movement of the other of said levers.

2. Clamping device according to claim 1, wherein said cooperating portions (17,18) of said levers (15,16) comprise meshing teeth.

3. Clamping device according to claim 1, wherein said means for defining a basic body defines handles (2,3) protruding away from the threaded clamping shaft when the basic body is positioned on the threaded clamping shaft, said handles (2,3) having recessed portions for receiving said actuating levers (15,16).

4. Clamping device according to claim 1, wherein said means for defining a basic body defines an annular collar spaced from the threaded clamping shaft, said threaded segments (13,14) being positionable in the space between said annular collar and the threaded clamping shaft.

5. Clamping device according to claim 1, wherein said means for defining a basic body defines an engagement surface (23), and wherein said swivelling levers have stop portions (21,22) engageable with said engagement surface (23) to limit engagement of said threaded segments (13,14) with the threaded clamping shaft.

6. Clamping device according to claim 1, wherein the distance between pivotal connections (9,10) of said swivelling levers (7,8) to said basic body is less than the distance between said threaded segments (13,14).

7. Clamping device according to claim 1, wherein said device further comprises means for biassing (19,20) said threaded segments (13,14) into engagement with the threaded clamping shaft.

8. Clamping device according to claim 1, wherein said device further comprises ring means (14) carried by said basic body (1) for exerting a clamping force on a vehicle wheel.

9. Clamping device according to claim 8, wherein said device further comprises shim means (6) positioned between said ring means (4) and said basic body (1) for reducing friction between said ring means and said basis body.

10. Clamping device according to claim 8, wherein said device further comprises a spring ring (5) for securing said ring means (4) on said basic body (1).

* * * * *